(12) United States Patent
Jääskeläinen et al.

(10) Patent No.: US 7,452,953 B2
(45) Date of Patent: *Nov. 18, 2008

(54) PROPYLENE RANDOM COPOLYMER AND PROCESS FOR THE PRODUCTION THEREOF

(75) Inventors: Pirjo Jääskeläinen, Porvoo (FI); Norbert Hafner, Linz (AT); Päivi Pitkänen, Halkia (FI); Markus Gahleitner, Neuhofen (AT); Olli Tuominen, Helsinki (FI); Wilfried Töltsch, Marchtrenk (AT)

(73) Assignee: Borealis Technology Oy, Porvoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/836,657

(22) Filed: Aug. 9, 2007

(65) Prior Publication Data

US 2007/0287818 A1   Dec. 13, 2007

Related U.S. Application Data

(62) Division of application No. 10/482,271, filed as application No. PCT/EP02/07081 on Jun. 26, 2002.

(30) Foreign Application Priority Data

Jun. 27, 2001   (EP) .................................. 01115471

(51) Int. Cl.
*C08F 210/16* (2006.01)

(52) U.S. Cl. ...................... 526/348; 526/65; 526/348.1; 525/53; 525/240

(58) Field of Classification Search ................... 526/65, 526/348, 348.1; 525/53, 240
See application file for complete search history.

(56) References Cited

U.S. PATENT DOCUMENTS

2001/0044506 A1 * 11/2001 Mehta et al. .................. 526/65

FOREIGN PATENT DOCUMENTS

| EP | 0 887 379 A | 12/1998 |
| EP | 0982328 A1 | 1/2000 |
| WO | WO 98 59002 A | 12/1998 |

* cited by examiner

*Primary Examiner*—Roberto Rábago
(74) *Attorney, Agent, or Firm*—Fay Sharpe LLP (57) ABSTRACT

The present invention relates to a process for preparing a propylene random copolymer comprising polymerization of propylene with a comonomer, said comonomer being ethylene or an α-olefin comprising at least four carbon atoms, in the presence of a catalyst in a multistage process comprising polymerization of propylene with a comonomer in a first reaction zone including at least one slurry reactor to give a first polymerization product, transferring said first product to a second reaction zone including at least one gas phase reactor and polymerizations of propylene with a comonomer in said gas phase reactor in the presence of said first polymerization product, wherein the temperature in the gas phase reactor is at least 10° C. higher than in the slurry reactor and to a polymer obtainable by this process. Furthermore, the invention relates to a propylene random copolymer prepared by copolymerization of propylene with a comonomer wherein the distribution of the comonomer determined according to the TREF method is multimodal, preferably bimodal, a propylene random copolymer prepared by copolymerization of propylene with a comonomer wherein the copolymer is having an elution interval determined according to the TREF method of 50° C. or more, a propylene random copolymer prepared by copolymerization of propylene with a comonomer, wherein the random copolymer is a unimodal polymer and the elution interval determined by the TREF method is given by the equation $Y \leq 4.5 \cdot m + 16$ wherein Y is the elution interval in ° C. and m is the percentage of ethylene in the copolymer in wt. %, and to the use of such a copolymers for the production of a film, of an article by blow moulding or injection moulding, of a fiber or of a pipe.

2 Claims, 7 Drawing Sheets

PROPYLENE RANDOM COPOLYMER AND PROCESS FOR THE PRODUCTION THEREOF

This application is a divisional application of U.S. Ser. No. 10/482,271, filed May 27, 2004, which is a national filing under 35 U.S.C. 371 of International Application No. PCT/EP02/07081, International Filing Date 26 Jun. 2002, which claims priority from European Patent Application 01115471.2, filed 27 Jun. 2001.

The present invention relates to a propylene random copolymer prepared by copolymerisation of propylene with a comonomer, the comonomer being ethylene or an α-olefin comprising at least four carbon atoms, in particular ethylene, and a process for the production of such a copolymer.

Propylene random copolymers, in particular with the comonomer being ethylene, have found widespread applications for example in the production of polymer films, of articles produced by blow moulding or injection moulding, of fibres and of pipes. Among these applications, the most important is the use for the production of films. Such film may e.g. be used for packaging such as food packaging.

In general, for the production of propylene random copolymers propylene is copolymerised with an α-olefin in a slurry or gas phase polymerisation reaction in the presence of a suitable catalyst. The amount of comonomer usually does not exceed 10 mol % of the total polymer.

In the production of a such random copolymer it is desirable that the comonomer in the final polymer is distributed randomly, i.e. that the comonomer units do not form blocks comprising only such comonomer units but instead are evenly distributed as single units within the polypropylene blocks which essentially make up the polymer chains.

Conventional processes for the production of propylene random copolymers usually only allow the production of copolymers with a predetermined comonomer distribution. This distribution may be tuned only to a limited extent by varying the temperature of the process.

It is known, however, that important properties of the copolymer such as the transparency of a film comprising the copolymer or the content of xylene solubles of the copolymer are decisively influenced by the comonomer distribution.

It has also been found that in propylene random comonomers produced according to conventional processes comonomers concentrate in short polymer chains. This negatively affects the properties of the polymer material and increases the undesired content of xylene solubles.

It is therefore an object of the present invention to provide a process for the production of a propylene random copolymer which allows the comonomer distribution to be tailored over a broad range and hence the provision of random copolymer materials with properties which can be fine-tuned by tailoring the comonomer distribution.

It is another object of the present invention to provide a process for the production of propylene random copolymers with a reduced content of xylene solubles.

The present invention is based on the finding that the above mentioned objects can be achieved by a multistage process for the production of propylene random copolymers comprising at least two reaction zones in which the copolymerisation of propylene and the comonomer subsequently is carried out wherein the different reaction zones are operated at different temperatures.

The present invention therefore provides a process for preparing a propylene random comonomer comprising polymerisation of propylene with a comonomer, said comonomer being ethylene or an α-olefin comprising at least four carbon atoms, in the presence of a catalyst in a multistage process comprising polymerisation of propylene with a comonomer in a first reaction zone including at least one slurry reactor to give a first polymerisation product, transferring said first product to a second reaction zone including at least one gas phase reactor and polymerisation of propylene with a comonomer in said gas phase reactor in the presence of said first polymerisation product, wherein the temperature in the gas phase reactor is at least 10° C. higher than that in the slurry reactor.

With the inventive process it is possible to produce propylene random copolymers with a tailored ethylene distribution and hence to fine-tune the properties of the produced polymer. Thus, by the inventive process the properties of the polymer can be adopted according to the desired application so that polymers are obtained with excellent properties for many kind of applications. For example, it is possible by the inventive process to obtain a propylene random copolymer with a very narrow comonomer distribution on the one hand and, on the other hand, a polymer with a very broad multi- or bimodal comonomer distribution as desired e.g. for film applications.

Further, it is an advantage of the inventive process that due to the tailored comonomer distribution usually polymers with a low degree of xylene solubles (XS) content are obtained. Thus, problems in the process which can be caused by polymers with higher XS content are avoided. In addition, even in case polymers with a rather high XS content are obtained, these XS values are not harmful due to the advantageous comonomer distribution.

For example, for the most important application of the propylene random copolymers as film materials the inventive process provides copolymers with low sealing inition temperature SIT, good optical properties such as good transparency and high gloss, high mechanical strength and high softness of the film.

However, it is also possible by the inventive process to fine-tune and hence to optimise properties of the produced random copolymer with respect to other applications such as blow moulding, injection moulding, fibre and pipe applications. For example, blow and injection moulded products made from the copolymers produced according to the inventive process have good optical properties, gloss and high mechanical strength. Further, less taste and odor problems occur.

It is a further advantage of the invention that by the inventive process a polymer can be produced having high comonomer, particularly ethylene content, which when used in film applications does not lead to blooming of the film, thus providing and maintaining good optical properties, especially transparency, of the film.

In the inventive process the temperature in the gas phase reactor is at least 10° C. and more preferably at least 15° C. higher than that in the slurry reactor.

In the inventive process the comonomer content of the product produced in the gas phase reactor may be lower, equal to or higher than that of the product produced in the slurry reactor.

Of course, due to the multistage nature of the inventive process both products after being produced are inseparably mixed with each other. The properties of the product produced in the gas phase reactors such as its ethylene content may nevertheless be determined by considering the corresponding values for the slurry reactor product and the final polymer and taking into account the production split.

Preferably, in the inventive process the comonomer content of the product produced in the gas phase reactor is the same or higher than that of the product produced in the slurry reactor and particularly preferred the comonomer content of the product produced in the gas phase reactor is higher than that of the product produced in the slurry reactor.

This preferred embodiment of the inventive process further enhances the flexibility of the process concerning the tailoring of the comonomer distribution and hence the fine-tuning of the properties of the produced polymer.

Preferably, the comonomer content of the product produced in the gas phase reactor is at least 0.5 wt. %, more preferably at least 1 wt. % higher than that of the product produced in the slurry reactor.

Further preferred, the comonomer used in the inventive process and hence contained in the inventive polymer is ethylene. Propylene-ethylene random copolymers are particularly suited for applications as mentioned above.

In the inventive process it is further preferred that the ethylene content of the product produced in the slurry reactor is from 2 to 6 wt. %, more preferably from 2 to 4 wt. %.

Further preferred, the ethylene content of the product produced in the gas phase reactor is from 3 to 12 wt. %, more preferably from 4 to 10 wt. %.

"Slurry reactor" designates any reactor such as a continous or simple batch stirred tank reactor or loop reactor operating in bulk or slurry, including supercritical conditions, in which the polymer forms in particulate form.

Preferably, the slurry reactor in the inventive process is operated as a bulk reactor. "Bulk" means a polymerisation in a reaction medium comprising at least 60 wt. % monomer.

Preferably, the bulk reactor is a loop reactor.

Further preferred, in the inventive process the temperature in the slurry reactor is 70° C. or more.

Still further preferred in the inventive process the temperature in the gas phase reactor is 80° C. or more, more preferably 85° C. or more.

In the inventive process in each of the different reactors—slurry reactor and gas phase reactor—a part of the final propylene random copolymer is produced. This production split between the reactors may be adjusted according to the desired properties of the produced copolymer.

It is preferred that the production split between the slurry reactor and the gas phase reactor is from 30:70 to 70:30, more preferred from 40:60 to 60:40 and most preferred from 45:55 to 55:45.

In the inventive process all catalysts suitable for the polymerisation of propylene with ethylene or an α-olefin such as single-site catalysts and Ziegler-Natta catalysts can be used. If single site catalysts are used, those described in WO 95/12627 and WO 00/34341 are preferred.

In a preferred embodiment of the inventive process, a Ziegler-Natta type catalyst system comprising a catalyst component (comprising also vinyl modified catalyst component), a cocatalyst component and an external electron donor is used. Such catalyst systems are described in, for example, U.S. Pat. No. 5,234,879, WO 92/19653, WO 92/19658 and WO 99/33843 and systems comprising vinyl modified catalyst components in WO 99/24478 and WO 99/24479. The content of these documents is herein included by reference.

Generally, the external donors are silane based donors having the formula (I)

$$R_n R'_m Si(R''O)_{4-n-m} \quad (I)$$

wherein

R and R' can be the same or different and stand for linear, branched or cyclic aliphatic or aromatic group;

R'' is methyl or ethyl;

n is an integer 0 to 3;

m is an integer 0 to 3; and n+m is 1 to 3.

The aliphatic groups in the meanings of R and R' can be saturated or unsaturated.

Preferably, R and R' are linear $C_1$ to $C_{12}$ hydrocarbons which include methyl, ethyl, propyl, butyl, octyl and decanyl. As examples of suitable saturated branched $C_{1-8}$ alkyl groups, the following can be mentioned: isopropyl, isobutyl, isopentyl, tert.-butyl, tert.-amyl and neopentyl. Cyclic aliphatic groups containing 4 to 8 carbon atoms comprise e.g. cyclopentyl, cyclohexyl, methylcyclopentyl and cycloheptyl.

According to the present invention the donors used can be strongly coordinating donors which form relatively strong complexes with catalyst surface, mainly with $MgCl_2$ surface in the presence of aluminium alkyl and $TiCl_4$.

Typically, this kind of donors have the structure of the general formula (II):

$$R'''_n Si(OMe)_{4-n} \quad (II)$$

wherein R''' is a branched aliphatic or cyclic or aromatic group and n is 1 or 2, preferably 2 [Härkönen et al., Macromol. Chem. 192 (1991) 2857-2863].

In particular, the external donor is selected from the group consisting of dicyclopentyl dimethoxysilane, diisopropyl dimethoxysilane, di-isobutyl dimethoxysilane and di-t-butyl dimethoxysilane, most preferably dicyclopentyl dimethoxysilane (D donor).

Optionally, the main polymerisation stages may be preceded by a prepolymerisation in which up to 10 wt. %, preferably 0.1 to 10 wt. % and most preferably 0.5 to 5 wt. % of the total amount of the polymer is produced.

The present invention further relates to a propylene random copolymer which may be obtained by the inventive process.

In one embodiment, the invention provides a propylene random copolymer prepared by the copolymerisation of propylene with a comonomer, the comonomer being ethylene or an α-olefin comprising at least four carbon atoms, wherein the distribution of the comonomer determined according to the TREF method is multimodal, preferably bimodal.

TREF (temperature rising elution fractionation) is a common method to fractionate polyolefins according to their solubility differences. It has been demonstrated for polypropylene that TREF fractograms qualitatively reflect the distribution of isotacticity in the polymer. The average length of isotactic chains increases almost linearly with increasing elution temperature (P. Ville et al., Polymer 42 (2001) 1953-1967). The results further showed that TREF does not strictly fractionate polypropylene according to tacticity but according to the longest crystallisable sequences in the chain. The solubility of a polypropylene polymer chain hence is influenced only by the concentration and distribution of sterical defects.

According to the invention it has been found that the inventive process provides for an even comonomer distribution in the inventive propylene copolymer. The comonomers act as sterical defects and hence interrupt the sequence of isotactic propylene monomers. By an even distribution of the comonomers an even distribution of sterical defects is obtained, i.e. it is possible by the inventive process to tailor the defect distribution and hence the isotacticity distribution of the polypropylene polymer.

It is hence possible to determine the comonomer distribution and accordingly its modality by the TREF method which in detail is described in the example section.

The term "modality of the comonomer distribution of the copolymer" refers to the form of the curve in the TREF fractogram, i.e. the appearance of the graph showing the polymer weight fraction as a function of its solution temperature.

If the polymer is produced in a multistage process, e.g. in the inventive process by using different ethylene contents in each reactor, the different polymer fractions produced in the different reactors will each have their own comonomer distribution which may considerably differ from one another. The TREF curve of the resulting final polymer is then obtained as a superposition of the TREF curves of the different polymer fractions.

Accordingly, this curve will for example show two or more distinct maxima, a maximum and one or more shoulders, or will at least be distinctly broadened compared to the curves for the individual fractions. The TREF curve is having such a shape so that for the person skilled in the art it is clear that the broadened curve is originating from a superposition of two or more different TREF curves and hence shows a multimodal ethylene distribution.

A polymer showing such a TREF curve is designated as having a "multimodal comonomer distribution".

Accordingly, "bimodal comonomer distribution" is designating the case that the TREF curve of the final polymer is originating from two polymer fractions with different ethylene distributions. This TREF curves for example is showing two different maxima, a maximum and a shoulder or is distinctly broadened. It is having such a shape so that for the person skilled in the art it is clear that the curve is originating from a superposition of two different TREF curves.

Preferably, the multimodal copolymer is having an elution interval of 50° C. or more.

Further preferred, the copolymer of this embodiment is having a melting temperature $T_m$ of 135° C. or higher.

Further preferred, the copolymer of this embodiment is having an ethylene content of 6 wt. % or lower.

The elution interval designates the temperature range of the polymer elution determined from the TREF curve, i.e. the temperature range $T_{end}$-$T_{start}$, wherein $T_{end}$ means the temperature where the last polymer fraction is eluted, i.e. at this temperature the polymer has been completely eluted from the column, and $T_{start}$ means the temperature where the polymer starts to elute, i.e. where the first fraction of the polymer is eluted (eluted weight fraction>0).

In a second embodiment the present invention provides a propylene random copolymer prepared by copolymerisation of propylene with a comonomer, the comonomer being ethylene or an α-olefin comprising at least four carbon atoms, wherein the copolymer is having an elution interval of 50° C. or more.

Preferably, the copolymer of this embodiment is having a melting temperature $T_m$ of 135° C. or higher.

Further preferred, the copolymer of this embodiment is having an ethylene content of 6 wt. % or lower.

The copolymer of this embodiment is preferably produced according to the inventive process and further preferred to all preferred embodiments of the inventive process wherein the ethylene content of the products from slurry reactor and gas phase reactor are different.

In a third embodiment the present invention provides a propylene random copolymer prepared by copolymerisation of propylene with a comonomer, the comonomer being ethylene or an α-olefin comprising at least four carbon atoms, wherein the random copolymer is a unimodal polymer and the elution interval is determined by the equation $$Y \leq 4.5 \cdot m + 16$$

wherein Y is the elution interval in ° C. and m is the percentage of ethylene in the copolymer in wt. %.

Such unimodal polymers are preferably produced by the inventive process wherein the ethylene content of the products from the slurry reactor and the gas phase reactor is the same.

The following described preferred embodiments relate to all of the above mentioned embodiments of the inventive polymer where appropriate.

In all propylene random copolymers according to the invention the amount of components eluting at temperatures of up to 90° C. as determined in accordance with the TREF method preferably is below 50 wt % of the whole amount of copolymer.

Further, it is preferred that in the inventive propylene random copolymer the comonomer is ethylene.

Further preferred, the total ethylene content of the copolymer is 3 wt. % or more, more preferably 5 wt % or more.

Further preferred, the total ethylene content of the copolymer is 12 wt. % or less, more preferably 8 wt. % or less.

It is a further advantage of the inventive copolymer produced according to the inventive process that in particular copolymers with high ethylene content>4 wt. % have a comparatively low content of xylene solubles.

Preferably, the inventive copolymer has a xylene solubles content from 4 to 24 wt. %, more preferred from 5 to 15 wt. % and still more preferred from 6 to 10 wt. %.

The inventive propylene random copolymers with the comonomer being ethylene produced by the inventive process usually have a $MFR_2$ from 0.5 to 100, preferably from 1 to 20.

The molecular weight distribution with a polydispersity $M_w/M_n$ of the inventive copolymer usually is from 2 to 8, preferably from 3 to 6.

In some applications such as high clarity film and thin wall packaging it is beneficial to have a narrow MWD. The molar mass and MWD of polypropylene can be modified by chemical cracking of the polymer chains, often called visbreaking, to enhance the polymer flow properties. Visbreaking is carried out in the extrusion step using organic peroxides with relatively high molar mass in a controlled manner. Statistically higher molar mass chains are cleaved more frequently than are lower molar mass molecules, resulting in an overall decrease in the average molar mass and a narrowing of MWD and decreasing of the SHI values. The amount of peroxide fed into the extruder is controlled to reach the desired molar mass and MWD and depends on the $MFR_2$ of the reactor product.

The polydispersity index, PI, which is calculated from cross over point of G'(ω) and G"(ω) indicates also the MWD. The PI value has been noticed to be dependent on the catalyst system. The SHI value correlates better with the MWD value obtained from GPC than the PI value.

Further, before the production of an article by using the inventive polymer conventional additives such as stabilizers, pigments, nucleating agents, slip- and antistatic agents may be added to the copolymer in small amounts.

The present invention further relates to a film, a blow-moulded article, an injection-moulded article, a fibre or a pipe comprising the inventive polymer as well as the use of the inventive polymer for the production of these products.

In the following the invention is further illustrated by means of examples with reference to the Figures.

EXAMPLES

1) Measuring Methods a) TREF-method:

Fractionation of the polypropylene samples was achieved by using analytical TREF. The TREF profiles were generated using a home made instrument, which is similar to a published design (Wild, L., Trends Polym Sci. 1993, 1, 50).

The sample was dissolved in xylene (2 to 4 mg/ml) at 130° C. and injected into the column at 130° C., and the latter was then cooled to 20° C. at a rate of 1.5 K/h. The column (150 mm length) was subsequently eluted with 1,2,4-trichlorobenzene (TCB) at a flow rate of 0.5 ml/min while the temperature was increased from 20° C. to 130° C. over 4.5 h. The output, detected with an i.r. detector operating at a wavelength of 3.41 µm, was presented as a fractogram normalised to constant area.

b) Xylene Solubles (XS):

For the determination of the xylene solubles fraction, 2.0 g of polymer is desolved in 250 ml p-xylene at 135° C. under agitation. After 30±2 min the solution is allowed to cool for 15 min at ambient temperature and then allowed to settle for 30 min at 25±0.5° C. The solution is filtered with filter paper into two 100 ml flasks.

The solution from the first 100 ml vessel is evaporated in nitrogen flow and the residue is dried under vacuum at 90° C. until constant weight is reached. The xylene soluble fraction is calculated using the following equation:

$$XS\% = (100 \cdot m_1 \cdot v_0)/(m_0 \cdot v_1)$$

wherein $m_0$ = initial polymer amount (g),
$m_1$ = weight of residue (g),
$v_0$ = initial volume (ml),
$v_1$ = volume of analysed sample (ml).

c) $M_w/M_n$ $M_w/M_n$ was determined using gel permeation chromatography (GPC) at 130° C. As an eluent, 1,2,4-trichlorobenzene (TCB) was used.

d) Melt Flow Rate (MFR)

$MFR_2$ was measured according to ISO 1133 at 230° C. and a load of 2.16 kg.

e) Thermal Properties

Melting temperature $T_m$, crystallisation temperature $T_{cr}$, and the degree of crystallinity were measured with a Mettler TA820 differential scanning calorimetry (DSC) on 3±0.5 mg samples. Both crystallisation and melting curves were obtained during 10° C./min cooling and heating scans between 30° C. and 225° C.

Melting and crystallisation temperatures were taken as the peaks of endotherms and exotherms. The degree of crystallinity was calculated by comparison with heat of fusion of a perfectly crystalline polypropylene, i.e. 209 J/g.

f) Viscosity Function and Shear Thinning (SHI)

Viscosity measurements are made with a dynamic rheometer (RDA-II QC).

The shear thinning index, SHI, is the most sensitive parameter for obtaining information about the MMD of polypropylene. SHI is calculated by dividing the Zero Shear Viscosity by a complex viscosity value obtained at a certain constant shear stress value, G*.

The Zero Shear Viscosity is defined as $$\eta_0 = \lim G''/\omega (\omega \to 0).$$

The abbreviation $SHI_{(0/50)}$ is the ratio between the zero shear viscosity and the viscosity at a shear stress of 50 000 Pa.

2) Production of Copolymers and Properties Thereof.

Continous multistage process was used to produce propylene copolymers. The process comprised a prepolymerisation step, a loop reactor and a fluidized bed gas phase reactor was used.

The catalyst used was highly active, stereospecific transesterified $MgCl_2$-supported Ziegler-Natta catalyst prepared according to U.S. Pat. No. 5,234,879 at a titanization temperature of 135° C. The catalyst was contacted with a cocatalyst (triethylaluminium, TEAL), and an external donor (donor D, dicyclopentyl dimethoxysilane) with the Al/Ti ratio of 200 and an Al/D ratio of 10, to yield a catalyst system.

The catalyst system and propylene were fed into the prepolymerisation reactor which was operated at 30° C. The prepolymerised catalyst was used in the subsequent polymerisation reactors.

Propylene, ethylene and hydrogen and the prepolymerised catalyst were fed into the loop reactor which was operated as bulk reactor at the temperatures as indicated in Table 1 and a pressure of 55 bar.

Then, the polymer slurry stream was fed from the loop reactor into the gas phase reactor which was operated at the temperatures as indicated in Table 1 and a pressure of 20 bar. More propylene, ethylene and hydrogen were fed into the gas phase reactor to control the desired properties of the final polymer.

In the comparative examples 1 and 2 propylene random copolymers were produced in the same manner as the inventive polymers except that two loop reactors instead of one gas phase and one loop reactor were used wherein the temperature in both loop reactors was the same (67° C.). The split between loop/gas phase reactor or loop/loop reactor (comparative examples) was 70/30 to 40/60.

TABLE 1

|  | Unit | Example 1 | Example 2 | Example 3 | Example 4 | Example 5 | Example 6 | Comp. Example 1 | Comp. Example 2 |
|---|---|---|---|---|---|---|---|---|---|
| Al/D | mol/mol | 10 | 10 | 10 | 10 | 10 | 10 | 10 | 10 |
| Al/Ti | mol/mol | 200 | 200 | 200 | 200 | 200 | 200 | 200 | 200 |
| Production split Loop: GPR/2nd loop) Loop |  | 70:30 | 40:60 | 45:55 | 45:55 | 50:50 | 55:45 | 60:40 | 60:40 |
| Temperature | °C. | 70 | 70 | 70 | 70 | 75 | 75 | 67 | 67 |
| Ethylene | wt. % | 3.2 | 3.9 | 3.4 | 3.5 | 2.0 | 2.0 | 3.5 | 4.7 |
| $MFR_2$ | g/10 min | 1.5 | 1.5 | 1.5 | 1.4 | 7.8 | 1.6 | 1.5 | 1.5 |
| GPR/2nd loop |  |  |  |  |  |  |  |  |  |
| Temperature Final Product | °C. | 85 | 85 | 85 | 85 | 85 | 85 | 67 | 67 |
| Ethylene | wt. % | 3.3 | 5.1 | 6.0 | 5.8 | 3.7 | 6.0 | 3.5 | 4.7 |
| $MFR_2$ | g/10 min | 1.3 | 1.3 | 1.5 | 1.4 | 8.3 | 1.5 | 1.5 | 1.5 |

For the production of films, the following additives were added to the produced copolymers of examples 1 to 3, 5 and 6 and comparative example 1:

| Irganox B215 | 1500 ppm |
| Calciumstearat | 1000 ppm |
| Erucamide | 1000 ppm |
| Oleamide | 1000 ppm |
| Syloblock 45 | 1800 ppm |

The copolymers for cast films (example 1 to 3 and 6) were visbroken with Triganox 101 with a twin-screw lab extruder BE-40.

For blow moulding tests, the polymer of example 4 was produced. The additive package for this polymer was 1500 ppm of Irganox B225, 500 ppm of Calciumstearat and 2000 ppm of Millad 3988.

3) Material Evaluation a) Polymer Structure and Properties

The analytical results of the polymers of table 1 are collected in table 2.

b) Ethylene Content and Distribution

Ethylene content in loop product varied between 2.0 and 3.9 wt. %. The final ethylene content was 3.3 wt. % to 3.7 wt. %, 5 wt. % to 6 wt. %.

Figure 1:
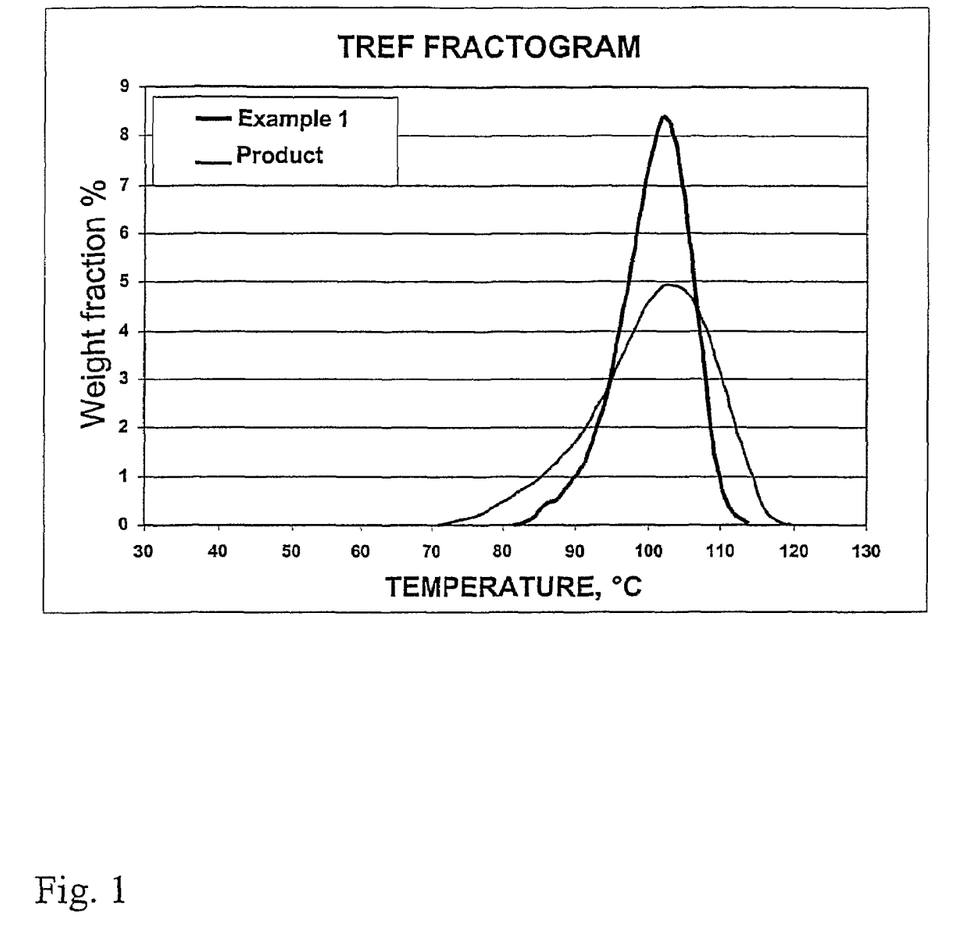
FIG. 1 shows a TREF fractogram of the propylene/ethylene random copolymer according to Example 1 having an overall ethylene content of 3.3 wt. % and the corresponding loop product showing the ethylene comonomer distribution in the polymer.
Figure 2:
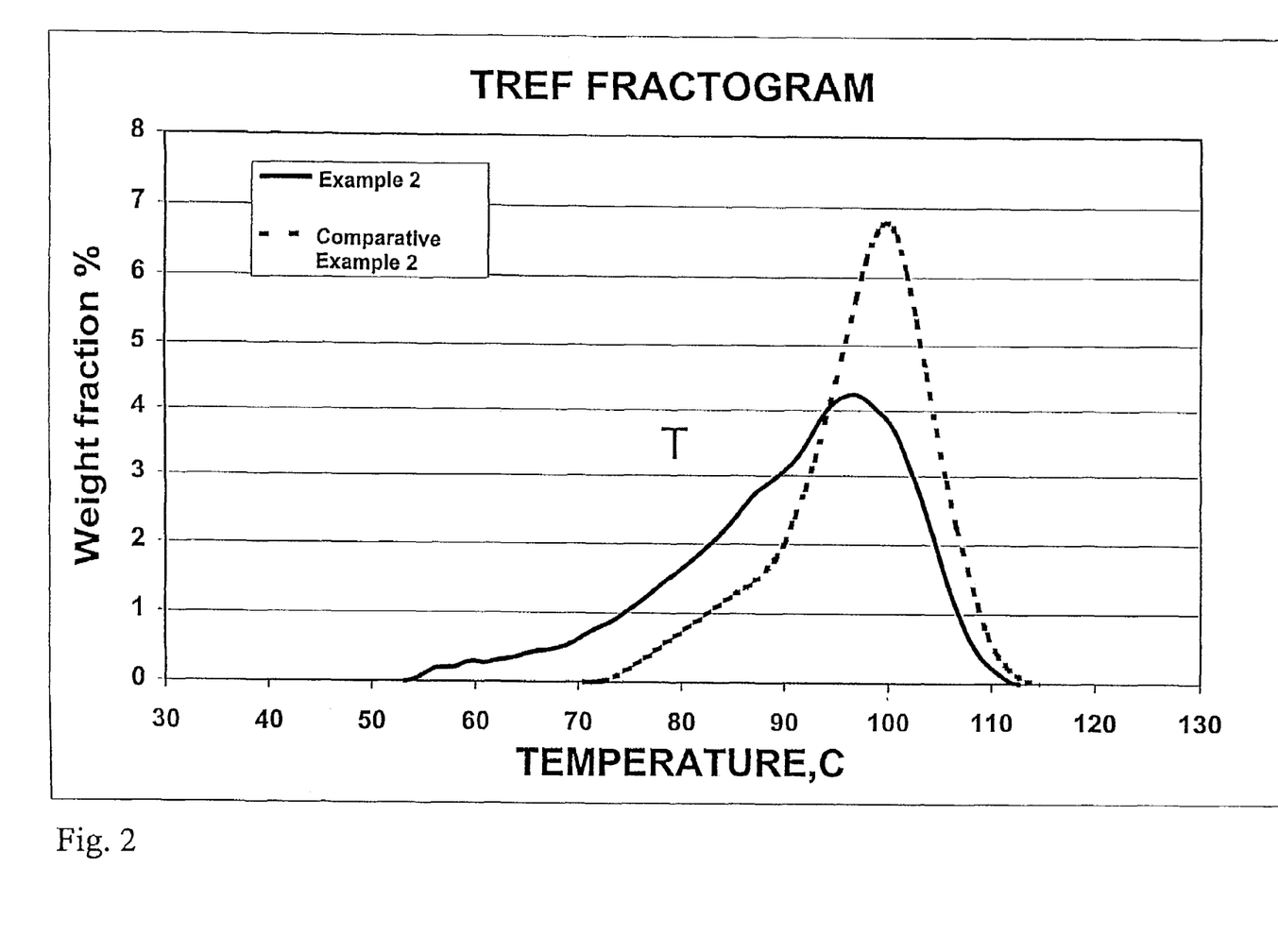
FIG. 2 shows a TREF fractogram showing the continuous TREF functions ("TREF curves") of the propylene/ethylene random copolymer according to example 2 and comparative example 2 having an overall ethylene content of around 5 wt. % (5.1 and 4.7, respectively) showing the bimodal ethylene comonomer distribution in the polymer of example 2. The continuous TREF curves were calculated from the data shown in FIG. 3.
Figure 3:
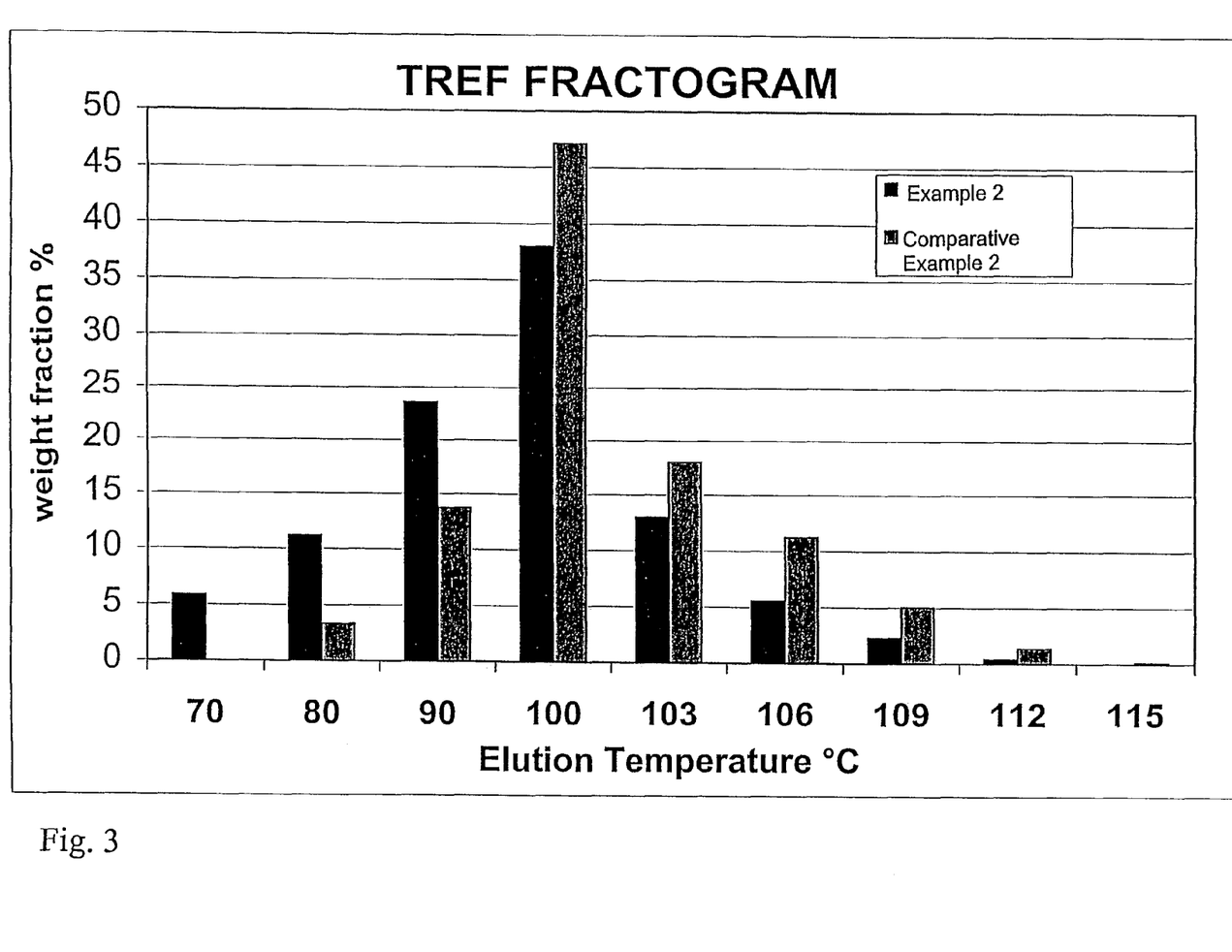
FIG. 3 shows TREF fractograms of the propylene/ethylene random copolymer according to example 2 and comparative example 2 having an overall ethylene content of around 5 wt. % (5.1 and 4.7, respectively).

The difference in ethylene distributions of two high ethylene content copolymers is clearly demonstrated in TREF curves (FIGS. 2 and 3).

TABLE 2

Analytical test results of Cast film and Blow Moulding polymers

| Sample |  | Example 1 | Example 2 | Example 3 | Example 4 | Example 5 | Example 6 | Comp. Ex. 1 | Comp. Ex. 2 |
|---|---|---|---|---|---|---|---|---|---|
| Pellets |  |  |  |  |  |  |  |  |  |
| $MFR_2$ | g/10 min | 7.3* | 7.9* | 7.2* | 1.4 | 8.3 | 5.1* | 8.0* | 8.0* |
| Ethene | wt. % | 3.3 | 5.1 | 6.0 | 5.8 | 3.7 | 6.0 | 3.2 | 4.7 |
|  | mol. % | 4.95 | 7.65 | 9.0 | 8.7 |  | 4.7 |  |  |
| XS | wt. % | 5.7 | 9.1 | 11.1 | 11.1 | 6.7 | 23.6 | 6.0 | 11 |
| elution interval | °C. | 30.2 | 58.5 | 60.5 | 60.5 | 66.4 | 78.6 |  | 40.9 |
| $T_m$ of PP | °C. | 142.8 | 137.2 | 137.6 | 139.2 | 143.0 | 139.9 | 142.0 | 136.2 |
| Crystallinity | % | 39.3 | 32.7 | 29.9 | 28.9 | 40.0 | 26.4 |  | 34.1 |
| RDA, Zero viscosity | Pas | 2500 | 2450 | 2720 | 24600 | 3540 | 3250 | 2420 |  |
| $SHI_{(0/50)}$ | Pa | 3.9 | 3.8 | 3.7 | 6.7 | 6.9 | 4.3 | 3.7 |  |

*visbroken c) Melting Behaviour

Loop ethylene content determined the melting point of product, and it was between 137 and 147° C. in spite of increased ethylene content in GPR.

Figure 4:
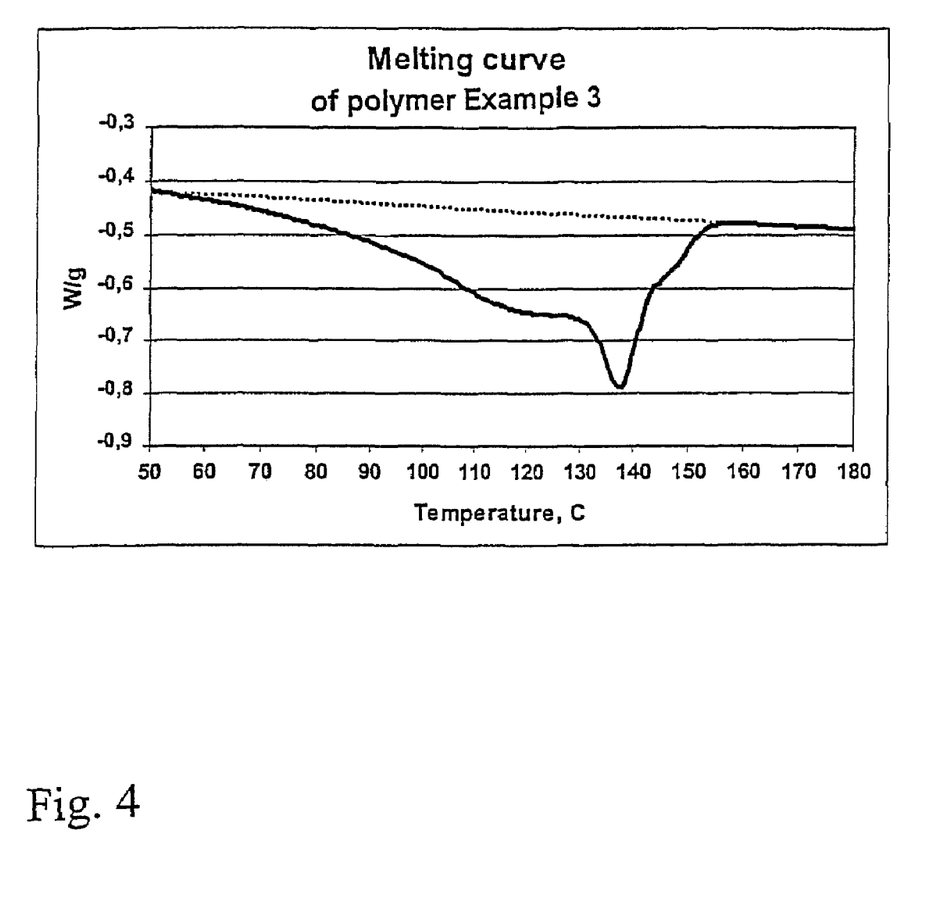
FIG. 4 shows the melting curve of propylene/ethylene random copolymer according to Example 3 having an overall ethylene content of 6 wt. %.
Figure 5:
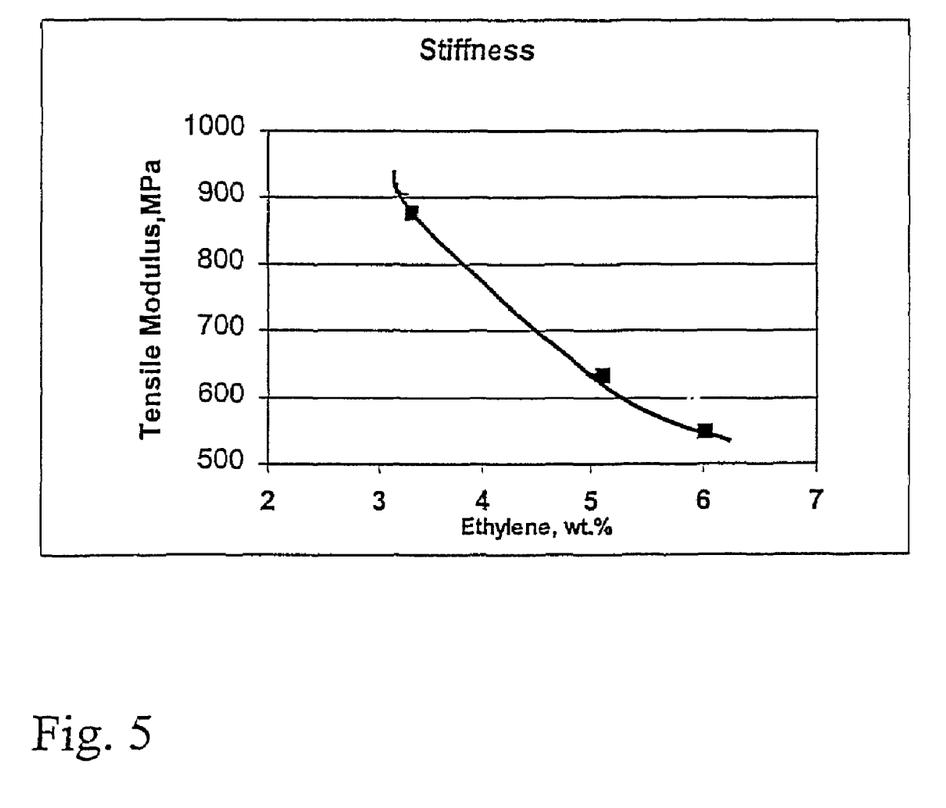
FIG. 5 shows the tensile modulus values of the inventive copolymers as a function of the total ethylene content.
Figure 6:
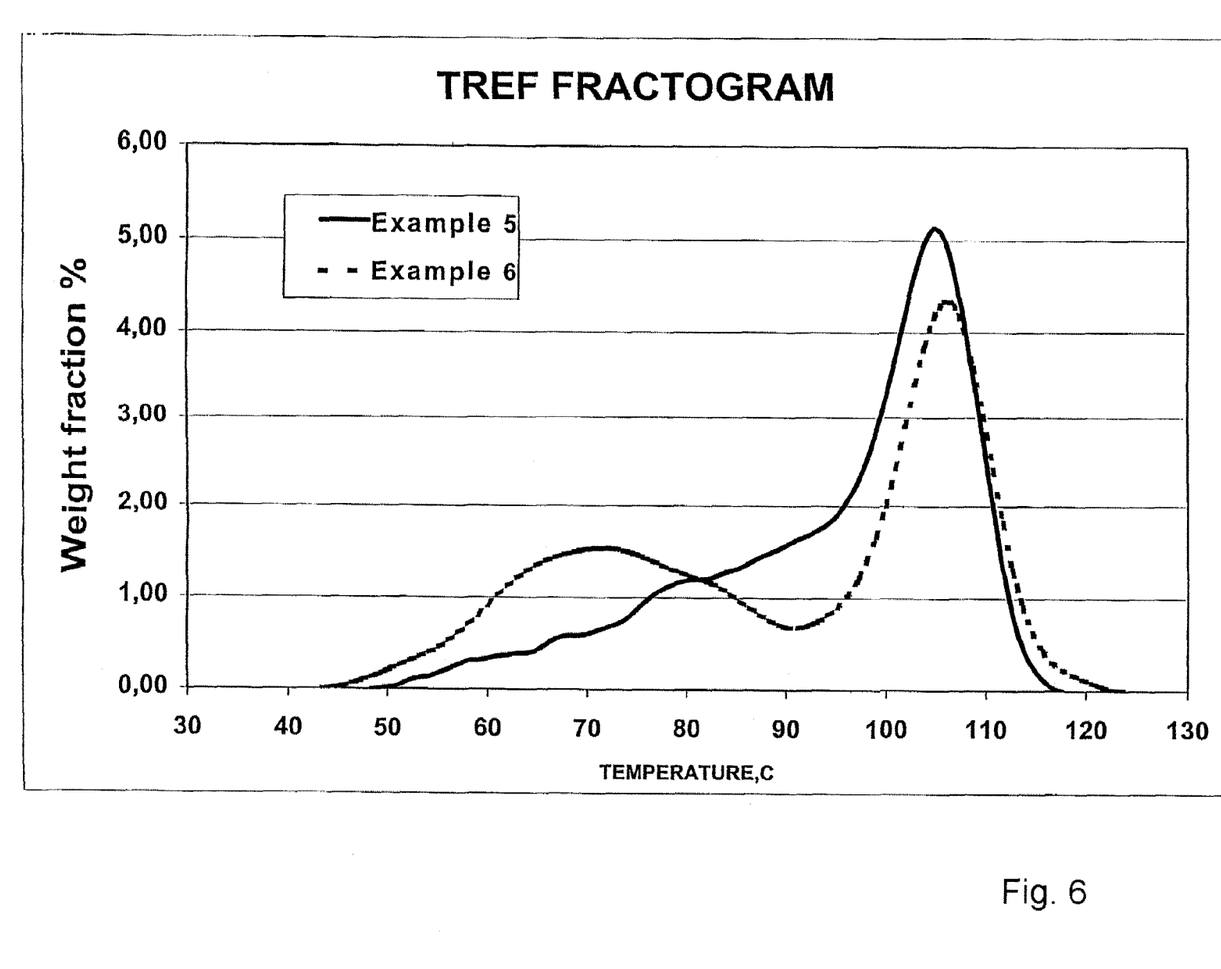
FIG. 6 shows a TREF fractogram of propylene/ethylene copolymers according to examples 5 and 6 showing a bimodal ethylene comonomer distribution which have been produced with low ethylene content in the loop reactor.
Figure 7:
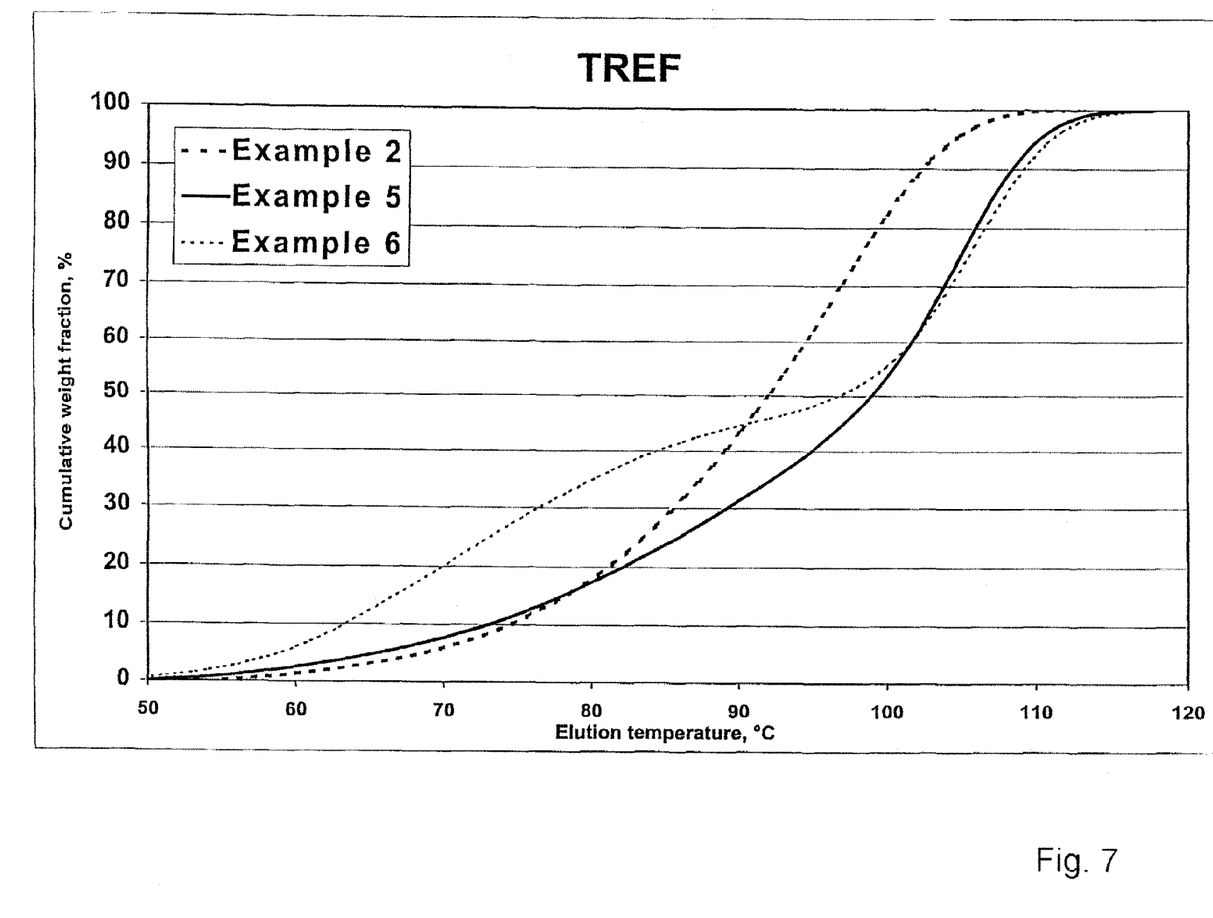
FIG. 7 shows the cumulative eluted weight fractions of the polymers of examples 2, 5 and 6.

The higher ethylene content in GPR was seen in broadening of the melting range. The shape of DSC curve indicates low seal initiation temperature and good sealing properties (FIG. 4).

d) Test Results of Cast Film and Blow Moulded Products

The test results of the cast film products and blow moulded products produced with the above described polymers are given in table 3.

TABLE 3

Mechanical test results of cast film products (examples 1 to 3, 5 and 6 and comparative example 1) and blow moulded products (example 4).

| Sample | | Ex. 1 | Ex. 2 | Ex. 3 | Ex. 4 | Ex. 5 | Ex. 6 | Comp. Ex. 1 |
|---|---|---|---|---|---|---|---|---|
| $MFR_2$ | g/10 min | 7.3 | 7.9 | 7.2 | 1.4 | 8.3 | 5.1 | 8.0 |
| Ethene | wt. % | 3.3 | 5.1 | 6 | 5.8 | 3.7 | 6.0 | 3.2 |
| Tens. stress at yield | MPa | 24.5 | 19.8 | 18.1 | 19.5 | 24.1 | 16.8 | 25.2 |
| Tensile modulus | MPa | 880 | 635 | 550 | 580 | 830 | 470 | 943 |
| Charpy, notched, RT | $kJ/m^2$ | 4.1 | 6 | 10.7 | 43.2 | 5.2 | 25.8 | 5.4 |
| 2 mm plaque, Haze | % | 85.3 | 82.6 | 80 | 20 | | | 85 |
| Gloss | | 90 | 86 | 85 | 106 | | | 88 |
| FILM 50 micron | | | | | | | | |
| 1% Sec. modulus | MPa | 418 | 324 | 295 | 345 | 380 | 260 | 411 |
| Haze | % | 3 | 3.3 | 3.2 | 4 | 2.4 | 0.7 | 2.0 |
| Gloss | | 132 | 130 | 130 | 118 | 139 | 147 | |

The invention claimed is:

1. A propylene random copolymer prepared by copolymerisation of propylene with a comonomer, the comonomer being ethylene or an α-olefin comprising at least four carbon atoms, wherein the random copolymer is a unimodal polymer and the elution interval determined by the TREF method is given by the equation $$Y \leq 4.5 \cdot m + 16$$

wherein Y is the elution interval in °C. and
m is the percentage of ethylene in the copolymer in wt %;
and wherein the total ethylene content of the copolymer is 5 wt % or more.

2. A propylene random copolymer according to claim 1 wherein the total ethylene content is from 5 wt % to 12 wt.%.

* * * * *